United States Patent Office 3,692,599
Patented Sept. 19, 1972

3,692,599
PROCESS OF FORMING HIGH-ENERGY
PROPELLANT BINDERS
John B. Gardiner, Mountainside, and Herschel T. White, Montclair, N.J., assignors to Esso Research and Engineering Company
No Drawing. Filed Feb. 28, 1963, Ser. No. 262,296
Int. Cl. C06d 5/06
U.S. Cl. 149—19    4 Claims This invention relates to a method of forming stronger high-energy binders, particularly polyacrylate binders containing $NF_2$ oxidizing groups, by using esters of peroxycarbonic acid as initiators in curing acrylates of $NF_2$-containing polymers.

As described in U.S. application Ser. No. 224,885, filed Sept. 11, 1962 by John B. Gardiner and Anthony J. Passannate, high-energy oxidizer binders obtained from $NF_2$-containing polyether acrylates have shown promise in chemical and physical characteristics for use in solid rocket propellants. Such binders are employed in proportions of about 5 to 30 wt. percent of the propellant to hold together other components which are dispersed in the binders, such as liquid oxidizers, solid oxidizers, and fuels, e.g. powdered metals of the class comprising B, Al, Be, Li and Mg, and compounds of such metals, such as their hydrides.

The liquid oxidizers that are most suitable for making the high-energy propellants are mainly organic compounds which contain $NF_2$ substituents, as in tetrakis-$(NF_2)$ butane and tetrakis $(NF_2)$ tetrahydrofuran. The liquids are absorbed in the $NF_2$-containing binders and behave in the manner of plasticizers while they impart a desired high-energy value to the propellant.

In the development of the $NF_2$-containing polymers and curing of these polymers with high loading of liquid $NF_2$-containing oxidizers, a number of defects have been found to arise, such as low tensile strength and low elongation at high strain rates, when curing is carried out with a conventional acrylate curing catalyst, such as dichlorobenzoyl peroxide. The physical defects of the cured binders made with conventional curing catalysts are phenomena which are difficult to understand, but may be partly attributed to inadequate polymerization at ordinary temperature conditions. It is difficult to use high curing temperatures, e.g. above 50° C., and avoid decomposition of the heat-sensitive components.

It has now been found, in accordance with the present invention, that the high-energy $NF_2$-containing polyacrylates can be cured more effectively with unexpected improvements in physical properties by using esters of peroxycarbonic acids as initiators at suitable low curing temperatures.

Esters of peroxycarbonic acids are described in an article by F. Strain et al. in the "Journal of American Chemical Society," vol. 72, 1254 (1950). The preferred esters are the dialkyl peroxydicarbonates represented by the formula:

wherein R represents alkyl groups having 2 to 4 carbon atoms, as in diethyl peroxydicarbonate and diisopropyl peroxydicarbonate. The suitable peroxydicarbonates are to be employed as the binder curing initiators in proportions of about 0.1 to 4 wt. percent, based on the polymer which is to be cured.

It is important to note that the peroxycarbonates, in general, are unstable compounds which decompose and may decompose explosively at normal temperatures, especially depending upon the kinds of other substances present. For example, esters of peroxydicarbonic acid tend to undergo decomposition at temperatures in the range of 10° to 60° C. and even the decomposition products, such as isopropyl alcohol, formed from the diisopropyl peroxydicarbonate promote violent decomposition of the ester. Thus, it can be seen that it is important in using a peroxydicarbonate in admixture with other substances that the other substances should not cause explosive decomposition.

The high-energy polyether acrylates containing $NF_2$ groups to be used in forming the cured binders are viscous liquid polymers having molecular weights in the range of about 500 to about 5,000. The starting materials for these polymers are polyethers having a suitable high content of $NF_2$ groups attached to carbon atoms and OH functionality. Some of the $NF_2$-containing polyethers may be made by expoxidizing an $NF_2$-containing olefin and polymerizing the resulting $NF_2$-containing epoxide. The preferred $NF_2$-containing polyethers have been made by reacting $N_2F_4$ with unsaturated polyethers, e.g. reacting $N_2F_4$ with polypentadiene monoxide which is obtained by polymerizing pentadiene monoxide.

The OH functionality of the polyether may be controlled by using modifiers such as glycidol, ethylene glycol, water or trimethylol propane.

The $NF_2$-containing polyethers are acrylated, preferably when an excess of acrylating agent, such as acryloyl chloride, acrylic anhydride, acrylic acid, and others which may have substituents and which may react with OH groups attached to the polyethers, which may be termed $NF_2$-polyether alcohols. The terms acrylates, polyacrylates and acrylating agent are intended to include the alpha-substituted methyl and homologous modifications.

While a variety of steps may be used in arriving at the final high-energy binder compositions, the present invention is concerned with the curing of the viscous liquid acrylate polymers that are to be loaded with oxidizers and fuels before the curing or casting. The initial materials, insofar as the present invention is concerned, are the $NF_2$-polyether acrylates such as are obtained by reacting the $NF_2$-polyether alcohols with an acrylating agent. A brief description will be given of the acrylated $NF_2$-polyether alcohols, how they are formed, and then how they are cured to the desired binder compositions.

PREPARATION OF $NF_2$-POLYETHER ALCOHOLS

In a preferred preparation of an $NF_2$-polyether alcohol for alkylation, 1,4-pentadiene monoxide having the formula:

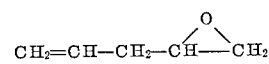

is polymerized with an epoxide polymerization catalyst, such as $PF_5$, using 0.01 to 10 wt. percent of the catalyst admixed with the epoxide monomer and carrying out the polymerization at 20° to 25° C. for a period of 0.5 to 72 hours until a viscous liquid polymer having a molecular weight in the range of about 500 to 5,000 is obtained. The OH functionlity of the polyether is controlled by addition of relatively small proportions of modifiers, such as preferably trimethylol propane. The resulting unsaturated polyether alcohol reacts with $N_2F_4$ smoothly using an excess of $N_2F_4$-chloroform or other halogen-substituted alkane solvent at 80° to 100° C. The resulting $N_2F_4$ adduct of the unsaturated polyether alcohol then contains $NF_2$ groups attached to carbon atoms which were linked together by double bonds. The adduct made from the polymerized 1,4-pentadiene monoxide may be termed poly[4,5- bis(difluoramino) pentene-1 oxide] and has a recurring unit formula represented as follows:

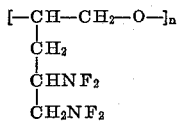

In this polyether, the recurring unit is present in a number $n$ times, for example, 4 to 50. The number of OH groups attached to the polymer chain depends on the method of modifying the polyether as it is formed with a modifying agent and, generally, it has an average of 1.5 to 2.5 or 3 OH groups per molecule, but this number may be higher.

Other $NF_2$-polyether alcohols which have been made similarly by forming $NF_2$ adducts of the polymerized unsaturated epoxides are polydivinylethylene oxide-$N_2F_4$ adduct having the recurring unit composition $$[C_6H_8(NF_2)_4O]$$

poly(3-methylene oxetane)-$N_2F_4$ adduct having the recurring unit composition $[C_4H_6(NF_2)_2O]$, polybutadiene oxide-$N_2F_4$ adduct having the recurring unit composition $[C_4H_6(NF_2)_2O]$. In general, the $NF_2$-containing polyether alcohols are indicated by the composition:

wherein $x$ is 4 to 6, $y$ is 6 to 8, $z$ is 2 to 4, and $n$ is 4 to 50.

ACRYLATION OF $NF_2$-POLYETHER ALCOHOLS

To form the pre-cured acrylates, the $NF_2$-polyether alcohols are reacted with acrylating agents, preferably in an excess of stoichiometric proportions, in the presence of a solvent such as acetonitrile and a catalyst in a dry system. The solvent and the excess of acrylating agents may be removed under vacuum.

In a typical scale-up acrylation of an $NF_2$-polyether alcohol, 17 g. (0.0133 mole) of trimethylol propane-modified polypentadiene monoxide-$N_2F_4$ adduct (1280 molecular weight) was mixed with 34 g. (0.38 mole) acrylol chloride containing 0.1% $Cu_2Cl_2$ polymerization inhibitor, 30 ml. dry acetonitrile and 0.05 g. of anhydrous zinc chloride powder. The mixture was stirred under $N_2$, heated to 55° C. for 3 hours, and then at 50° C. for 1 hour. Excess solvent and excess acid chloride are removed by $N_2$ and by vacuum.

Similar acrylates were made with $H_2O$-modified polyether-$N_2F_4$ adducts.

In general, the acrylates of the $NF_2$-containing polyether alcohols are represented as having the compositional formula:

where in the polyether recurring unit, $x$ is 4 to 6, $y$ is 6 to 8, $z$ is 2 to 4, $n$ is 4 to 50, R is of the group consisting of hydrogen and $C_1$ to $C_5$ alkyl substituent, and $v$ is 1 to 3. The diacrylate of poly[bis($NF_2$) pentene-1 oxide] may be represented by the formula:

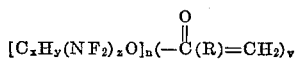

$n$ being 4 to 50.

The recurring polyether units containing $NF_2$ groups, such as polydivinylethylene oxide-$N_2F_4$ adduct and the $N_2F_4$ adduct of poly(3-methylene oxetane) similarly may be acrylated to attach the terminal acrylate radicals through the OH functions of the polyether alcohols.

CURING OF ACRYLATES OF $NF_2$-CONTAINING POLYETHERS

Although considerable progress has been made in producing high-energy polyacrylate binders from the $NF_2$- polyether acrylates using initiators such as dichlorobenzoyl peroxide and azoisobutyronitrile, a number of studies have shown that there are variations of tensile strength and elongation with temperature and rate of strain which made improvement of the physical characteristics desirable. The need for the improvement in physical characteristics of the cured binder has, in some instances, shown up only after the curing of the binder is carried out in the presence of other components, such as the solid oxygen-oxidizers. It is with respect to the improved curing of the $NF_2$-polyether acrylates in propellant formulations with liquid $NF_2$-containing oxidizers, solid oxygen oxidizers, and powdered metal fuels that the peroxycarbonate initiators showed up particularly well, especially with the curing of the formulations being carried out at temperatures in the range of 20° to 50° C., and preferably at about 25° to 45° C. Some of the improvements showed up without the loading of the polymer by the other components.

As an example, diethyl peroxydicarbonate was made as follows:

2.2 g. of NaOH is dissolved in 25 ml. of water with stirring. The mixture is cooled to 10° C. and 3.4 ml. of 30% hydrogen peroxide added. This solution of $Na_2O_2$ is slowly added to 4.75 ml. of ethyl chloroformate at between 6° to 10° C. The mass is kept at 10° C. for 30 minutes. The product is kept as solid or in solution in a −25° C. freezer. Analysis shows 60% pure peroxide.

Experiments were made to determine whether the diethyl peroxydicarbonate could be used in comparison to other initiators for polymerizing polypentadiene monoxide-$N_2F_4$ adduct acrylate at room temperature and it was found that the diethyl peroxydicarbonate executed polymerization of the acrylate in 1 hour at room temperature, whereas no polymerization of the acrylate took place at room temperature during 8 hours in using other compounds as initiators, such as dichlorobenzoyl peroxide and azoisobutyronitrile. Higher temperatures were needed with such other initiators, for example, temperatures of about 50° C. to above 75° C., for polymerization in the same length of time.

A further comparison was made of the diethyl peroxydicarbonate (DEPDC) initiator with the dichlorobenzoyl peroxide (DCBP) initiator in curing an $NF_2$-polyether acrylate without loading and tests were made of the resulting cured polymers as shown in the following table:

TABLE I.—COMPARISON OF DIETHYL PEROXYDICARBONATE (DEPDC) AND DICHLOROBENZOYL PEROXIDE (DCBP)

| Initiator | Tensile strength p.s.i. | Elongation at break percent | Cure Temp., ° C. | Cure Time hrs. |
|---|---|---|---|---|
| DEPDC | 570 | 80 | 40 | 16 |
| DCBP | 600 | 40 | 55 | 16 |

It was thus first indicated that the diethyl peroxydicarbonate initiator was advantageous mainly for improved elongation of the cured binder. However, additional tests showed that the lower temperature cure with the diethyl peroxydicarbonate initiator makes the cured binder stronger when the strength is evaluated in terms of tensile strength with the application of strain at certain rates, as, for example, in a tester known as an Instron tester in which a strain of 0.5 inch per minute is applied to the specimen being tested.

The use of diethyl peroxydicarbonate initiator for improved curing is demonstrated in the following propellant formulations in which trimethylol propane-modified polypentadiene monoxide-$N_2F_4$ adduct acrylate is the liquid polymer to be cured.

TABLE II.—FORMULATIONS WITH DIETHYL PEROXYDICARBONATE

|  | Dichlorobenzoyl peroxide | | Diethyl peroxydicarbonate |
| --- | --- | --- | --- |
| Formulation No. 1: |  |  |  |
| Percent initiator, based on polymer to be cured | 0.4 | 0.4 | 0.4 |
| Percent binder (including 2% ethylene diacrylate) | 25.0 | 25.0 | 25.0 |
| Tetrakis (difluoramino) butane | 35.0 | 35.0 | 35.0 |
| Ammonium perchlorate | 31.2 | 31.2 | 31.2 |
| Aluminum | 8.8 | 8.8 | 8.8 |
| Curing conditions: |  |  |  |
| Time, hrs | 16 | 72 | 72 |
| Temp./° C | 52 | 25 | 42 |
| Physical properties: tensile, p.s.i | 44 | 102 | 133 |
| Formulation No. 2: |  |  |  |
| Percent initiator, based on monomer | 0.4 |  | 0.4 |
| Percent binder (no ethylene diacrylate) | 25.0 |  | 25.0 |
| Tetrakis (difluoramino) butane | 35.0 |  | 35.0 |
| Ammonium perchlorate | 31.2 |  | 31.2 |
| Aluminum | 8.8 |  | 8.8 |
| Curing conditions: |  |  |  |
| Time, hrs | 16 |  | 16 |
| Temp./° C | 55 |  | 40 |
| Physical properties: |  |  |  |
| Tensile, p.s.i | <1 |  | 45 |
| Elongation, percent | <10 |  | 25 |

Curing at 40° C. with the diethyl peroxydicarbonate and without the ethylene diacrylate cross-linking agent was equivalent to curing at 52° C. with dichlorobenzoyl peroxide and with 2% ethylene diacrylate as cross-linking agent. With respect to the curing time for obtaining a similar tensile strength, the omission of the cross-linking agent is in favor of increased energy value.

Various other $NF_2$-containing liquid oxidizers may be used, such as $NF_2$-substituted alkane homologs of tetrakis($NF_2$) butane, $NF_2$-substituted dialkyl ethers and $NF_2$-substituted epoxy alkanes of 2 to 10 carbon atoms per molecule with an $NF_2$ substituent group attached to each carbon atom.

The solid oxygen containing oxidizer may be selected from a variety of such oxidizers, such as hydrazine perchlorate, hydrazine diperchlorate, hydrazine nitroformate, hexanitroethane, and others. In the typical formulations, the liquid oxidizing agent containing $NF_2$ groups and the solid oxygen containing oxidizers are used in proportions of from 20 to 60 wt. percent of the mixture containing the binder, the oxidizers, and the fuel. In using the peroxydicarbonate initiator in a variety of formulations, such as described, to cure the $NF_2$-containing acrylate polymers, the formula mixtures formed gels more quickly and at low temperatures, thus helping to lower loss by volatility and by decomposition of the high-energy components and, at the same time, helping to prevent separation of solid particles from the slurried mixes in which the polymer binder is to be cured.

The invention described is claimed as follows:

1. In curing $NF_2$-containing acrylate polymers used as binders in high-energy rocket propellants, the improvement which comprises curing said polymers with an admixed small amount of an ester of peroxycarbonic acid as a curing initiator and at a curing temperature in the range of about 20° to 50° C.

2. In curing a polyether acrylate which contains an $NF_2$ group attached to each of 2 to 4 carbon atoms in recurring monomer units and which is used as a binder in a high-energy solid rocket propellant, the improvement which comprises curing the polyether acrylate to a stronger binder with an admixed proportion of 0.1 to 4 wt. percent of a dialkyl peroxycarbonate having 2 to 4 carbon atoms in the alkyl groups as curing initiator, the curing being carried out at a temperature in the range of about 20° to 50° C.

3. In curing a polyether acrylate to form a stronger binder as set forth in claim 2, said polyether acrylate having principally a recurring unit compositional formula:

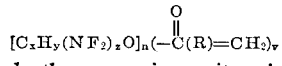

wherein the polyether recurring unit, $x$ is 4 to 6, $y$ is 6 to 8, $z$ is 2 to 4, $n$ is 4 to 50, $R$ is of the group consisting of hydrogen and $C_1$ to $C_5$ alkyl substituent, and $v$ is 1 to 3.

4. In curing a polyether acrylate to form a stronger binder as set forth in claim 2, said polyether acrylate being an acrylate of poly[bis($NF_2$) pentene-1 oxide] with 1 to 3 terminal acrylate groups, said polyether acrylate being mixed with a liquid oxidizer containing $NF_2$ groups, a solid oxygen containing oxidizer, and a metal fuel as it is being cured by diethyl peroxycarbonate as a dialkyl peroxycarbonate curing initiator.

References Cited

UNITED STATES PATENTS 3,441,549   4/1969   Gardiner et al. _____ 149—19 X

BENJAMIN R. PADGETT, Primary Examiner

U.S. Cl. X.R.

149—20, 44; 260—89.5 S, 89.5 R, 88.3 A, 86.1 N